(12) United States Patent
Watanabe et al.

(10) Patent No.: US 12,535,628 B2
(45) Date of Patent: Jan. 27, 2026

(54) OPTICAL DEVICE

(71) Applicant: HAMAMATSU PHOTONICS K.K., Hamamatsu (JP)

(72) Inventors: Tsubasa Watanabe, Hamamatsu (JP); Hiroto Sakai, Hamamatsu (JP); Yasushi Ohbayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 280 days.

(21) Appl. No.: 18/014,500

(22) PCT Filed: Jun. 16, 2021

(86) PCT No.: PCT/JP2021/022922
§ 371 (c)(1),
(2) Date: Jan. 5, 2023

(87) PCT Pub. No.: WO2022/019012
PCT Pub. Date: Jan. 27, 2022

(65) Prior Publication Data
US 2023/0258951 A1  Aug. 17, 2023

(30) Foreign Application Priority Data

Jul. 21, 2020 (JP) .................... 2020-124455

(51) Int. Cl.
*G02B 5/28* (2006.01)
*G02B 27/00* (2006.01)
*G02B 27/09* (2006.01)

(52) U.S. Cl.
CPC ........... *G02B 5/28* (2013.01); *G02B 27/0012* (2013.01); *G02B 27/095* (2013.01)

(58) Field of Classification Search
CPC .. G02B 27/1026; G02B 27/0012; G02B 5/28; G02B 27/095
See application file for complete search history.

(56) References Cited

U.S. PATENT DOCUMENTS

2002/0105629 A1  8/2002  Sandstrom et al.
2009/0185141 A1* 7/2009  Chen ............... H04N 9/3161
                                             353/38

(Continued)

FOREIGN PATENT DOCUMENTS

CN      101385037 A    3/2009
JP      H10-153747 A   6/1998

(Continued)

OTHER PUBLICATIONS

International Preliminary Report on Patentability mailed Feb. 2, 2023 for PCT/JP2021/022922.

*Primary Examiner* — Stephone B Allen
*Assistant Examiner* — Tamara Y. Washington
(74) *Attorney, Agent, or Firm* — Faegre Drinker Biddle & Reath LLP

(57) ABSTRACT

An optical apparatus includes an optical system for outputting parallel light, and an angle filter disposed on an optical path of the parallel light output from the optical system. The angle filter includes a dielectric multilayer film in which dielectric layers having a first refractive index $n_1$ and dielectric layers having a second refractive index $n_2$ lower than the first refractive index $n_1$ are alternately stacked.

4 Claims, 12 Drawing Sheets

(56) References Cited

U.S. PATENT DOCUMENTS

| | | | |
|---|---|---|---|
| 2009/0294634 A1* | 12/2009 | Kurahashi | G03B 11/00 |
| | | | 250/226 |
| 2010/0053711 A1 | 3/2010 | Haussler | |
| 2012/0057902 A1* | 3/2012 | Shouji | B32B 37/14 |
| | | | 257/E33.072 |
| 2017/0227906 A1 | 8/2017 | Kato et al. | |

FOREIGN PATENT DOCUMENTS

| JP | 2015-072387 A | 4/2015 |
|---|---|---|
| JP | 2017-097280 A | 6/2017 |
| WO | WO-02/031592 A1 | 4/2002 |

\* cited by examiner (a)

(b)

OPTICAL DEVICE

TECHNICAL FIELD

The present disclosure relates to an optical apparatus.

BACKGROUND ART

Patent Document 1 discloses a technique related to an optical filter. The optical filter includes a dielectric multilayer film in which low refractive index layers and high refractive index layers are alternately stacked, and is intended to transmit incident light when an incident angle is within a predetermined angle.

CITATION LIST

Patent Literature

Patent Document 1: Japanese Patent Application Laid-Open Publication No. 2017-97280

SUMMARY OF INVENTION

Technical Problem

It is desired to provide an angle filter capable of selectively extracting a desired angular component from light propagating through space and removing other angular components. For example, in a spatial light modulator of a phase modulation type, due to a diffraction effect occurring in each pixel, unnecessary light may be emitted in an angle direction different from an emitting angle corresponding to an incident angle of light. When the above unnecessary light can be removed using the angle filter, the quality of light emitted from the spatial light modulator is improved.

An object of an embodiment is to provide an optical apparatus including an angle filter capable of selectively extracting a desired angular component from light propagating through space and removing other angular components.

Solution to Problem

An embodiment is an optical apparatus. The optical apparatus includes an optical system for outputting parallel light; and an angle filter disposed on an optical path of the parallel light output from the optical system, and the angle filter includes a dielectric multilayer film in which dielectric layers having a first refractive index and dielectric layers having a second refractive index lower than the first refractive index are alternately stacked.

In the above configuration, a transmittance and a reflectance of the dielectric multilayer film change according to an incident angle of light, and the property thereof can be controlled by a layer structure (thickness of each layer, number of stacked layers, and material) of the dielectric multilayer film. Therefore, according to the above configuration, it is possible to selectively extract a desired angular component from light propagating through space and remove other angular components.

Advantageous Effects of Invention

According to the embodiment, it is possible to provide an optical apparatus including an angle filter capable of selectively extracting a desired angular component from light propagating through space and removing other angular components.

DESCRIPTION OF EMBODIMENTS

Hereinafter, embodiments of an optical apparatus will be described in detail with reference to the accompanying drawings. In the description of the drawings, the same elements will be denoted by the same reference signs, and redundant description will be omitted. The present invention is not limited to these examples.

Figure 1:
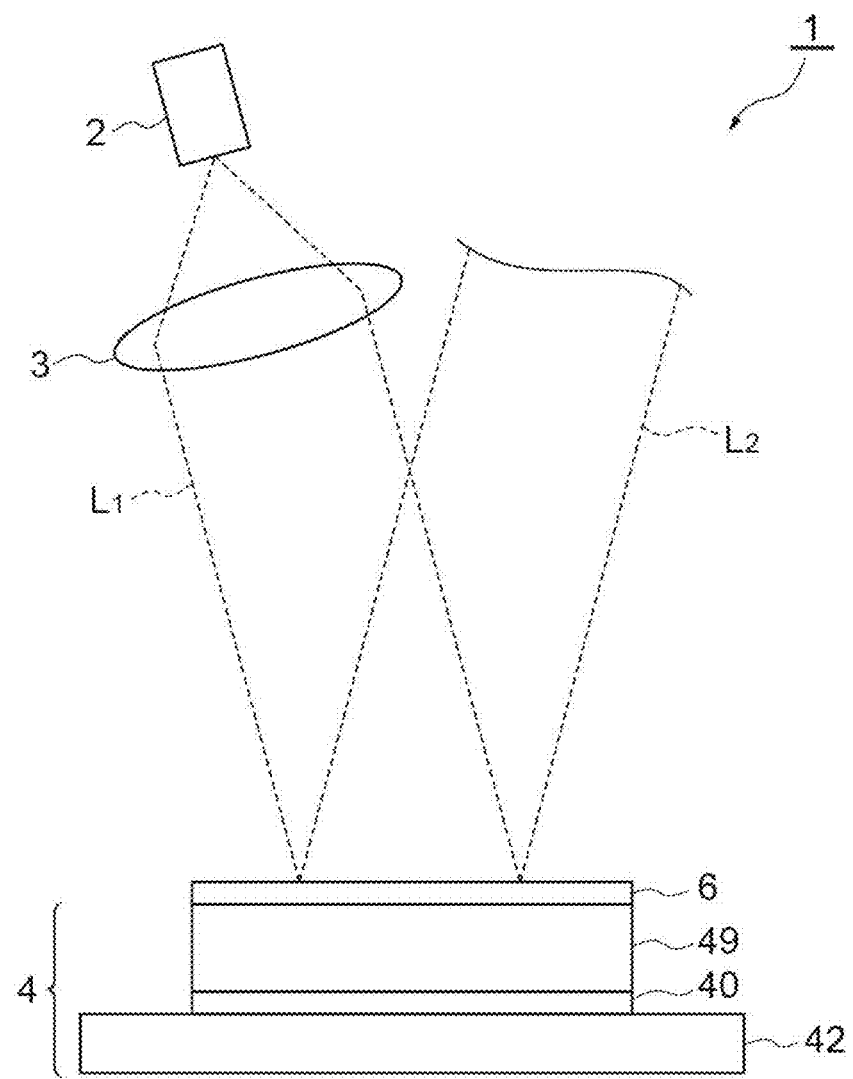
FIG. 1 is a diagram schematically illustrating a configuration of an optical apparatus according to an embodiment.

FIG. 1 is a diagram schematically illustrating a configuration of an optical apparatus 1 according to an embodiment. The optical apparatus 1 includes a light source 2, an optical system 3, a spatial light modulator 4, and an angle filter 6.

The light source 2 outputs coherent modulation target light $L_1$ of a single wavelength. The light source 2 is constituted by including, for example, a laser light source such as a semiconductor laser element, or an incoherent light source such as a super luminescence diode (SLD). An output wavelength of the light source 2 is included in, for example, a visible region, or an invisible region such as an ultraviolet region or an infrared region (including a near-infrared region). In one example, the output wavelength of the light source 2 is set in a range of 200 nm to 2000 nm.

The optical system 3 is optically coupled to the light source 2 via the space, and receives the modulation target light $L_1$ output from the light source 2. The optical system 3 parallelizes (collimates) the modulation target light $L_1$, and outputs it as parallel light. The optical system 3 may be constituted by various optical systems including, for example, one or a plurality of convex lenses. In addition, in the present embodiment, the "parallel light" does not mean that a fluctuation of a beam diameter in an optical axis direction is strictly zero. For example, a profile of the beam may have an angle of 3° or less with respect to the optical axis.

The spatial light modulator 4 is optically coupled to the optical system 3 via the space. The spatial light modulator 4 inputs the modulation target light $L_1$ being the parallel light output from the optical system 3, spatially modulates a phase of the modulation target light $L_1$, and outputs modulated light $L_2$. The spatial light modulator 4 has a configuration of a reflection type. That is, the spatial light modulator 4 spatially modulates the phase of the incident light when reflecting the light. The modulated light $L_2$ output from the spatial light modulator 4 is also parallel light.

The spatial light modulator 4 includes a silicon substrate 42, a modulation unit 40 provided on the silicon substrate 42, and a transparent substrate 49 provided on the modulation unit 40. That is, the modulation unit 40 is sandwiched between the silicon substrate 42 and the transparent substrate 49.

The modulation unit 40 displays a phase pattern. The modulation unit 40 has a plurality of pixels arranged one-dimensionally or two-dimensionally, and modulates a phase or an intensity of the modulation target light $L_1$ in each pixel according to a magnitude of a drive signal (for example, a drive voltage). The spatial light modulator 4 of the present embodiment is of a liquid crystal type, and is, for example, a liquid crystal on silicon spatial light modulator (LCOS-SLM) or a liquid crystal display (LCD).

The angle filter 6 is an optical filter of a transmission type disposed on an optical path of the parallel light output from the optical system 3. In the present embodiment, the angle filter 6 is disposed on an optical path of the modulated light $L_2$, and is preferably disposed on the modulation unit 40 of the spatial light modulator 4.

In the example illustrated in the diagram, the angle filter 6 is disposed on the transparent substrate 49, and is integrated with the transparent substrate 49. The angle filter 6 selectively transmits a desired angular component (for example, nth-order diffracted light (n is an integer)) included in the modulated light $L_2$, and blocks an unnecessary angular component (mth-order diffracted light (m is an integer other than n)) included in the modulated light $L_2$.

Figure 2:
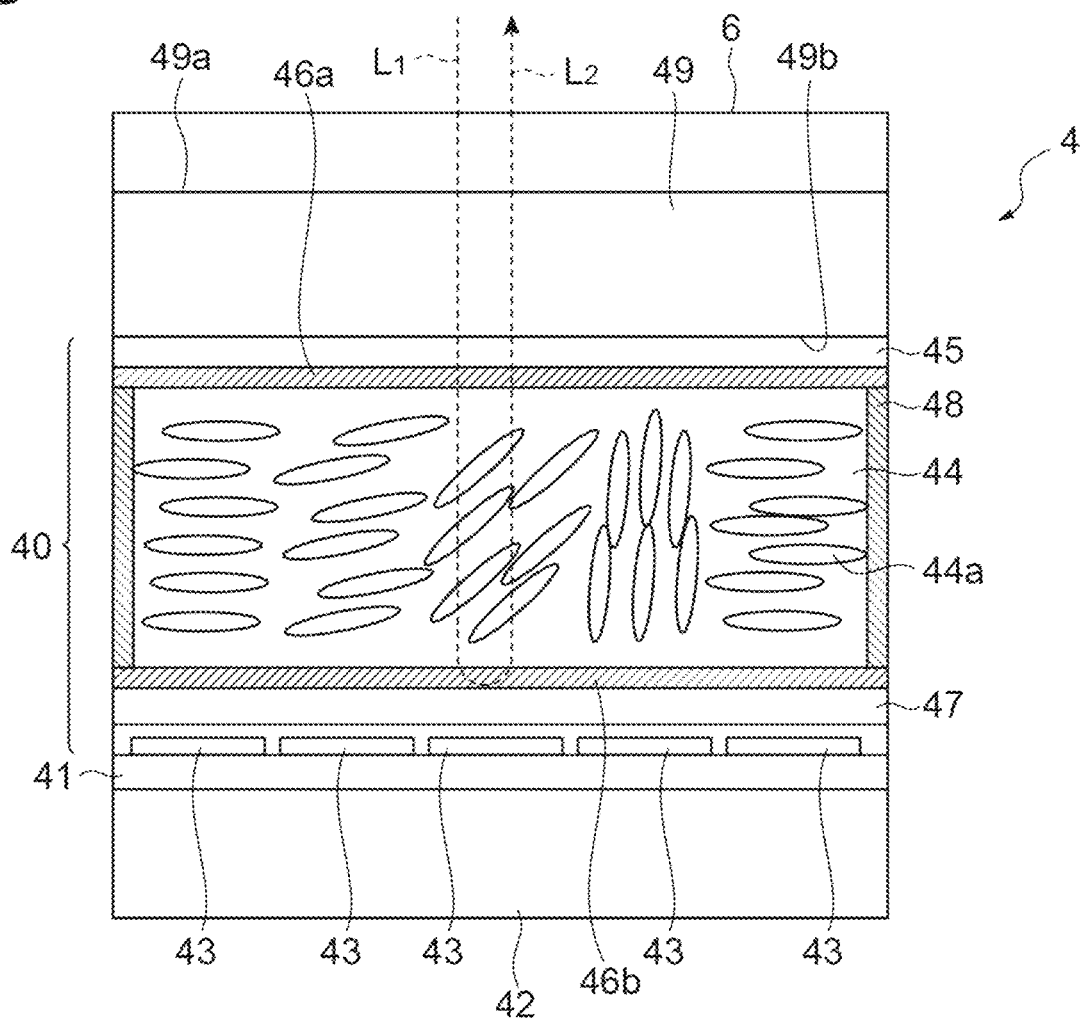
FIG. 2 is a cross-sectional view schematically illustrating a configuration of a spatial light modulator.

FIG. 2 is a cross-sectional view schematically illustrating a configuration of the spatial light modulator 4, and illustrates the cross-section along a central axis line of the modulation target light $L_1$ being incident on the modulation unit 40. As illustrated in FIG. 2, the modulation unit 40 includes a plurality of pixel electrodes 43, a liquid crystal layer 44, a transparent electrode 45, alignment films 46a and 46b, a dielectric mirror 47, and a spacer 48.

The transparent substrate 49 is made of a material having a light transmitting property of transmitting the modulation target light $L_1$, and is arranged along a principal surface of the silicon substrate 42. In addition, having the light transmitting property means a property of transmitting 90% or more of light of a target wavelength. When the wavelength of the modulation target light $L_1$ is included in the visible region, the transparent substrate 49 may be mainly made of, for example, a material such as synthetic quartz or glass (BK-7 in one example).

The plurality of pixel electrodes 43 are arranged in a two-dimensional lattice pattern on the principal surface of the silicon substrate 42, and constitute respective pixels of the modulation unit 40. The transparent electrode 45 is disposed on a surface 49b of the transparent substrate 49 facing the plurality of pixel electrodes 43. The liquid crystal layer 44 is disposed between the plurality of pixel electrodes 43 and the transparent electrode 45. The liquid crystal layer 44 is made of liquid crystal such as nematic liquid crystal, for example, and contains a large number of liquid crystal molecules 44a.

The alignment film 46a is disposed between the liquid crystal layer 44 and the transparent electrode 45, and the alignment film 46b is disposed between the liquid crystal layer 44 and the plurality of pixel electrodes 43. The dielectric mirror 47 is disposed between the alignment film 46b and the plurality of pixel electrodes 43. The dielectric mirror 47 reflects the modulation target light $L_1$ being incident from the transparent substrate 49 and transmitted through the liquid crystal layer 44.

The spatial light modulator 4 further includes a drive circuit 41. The drive circuit 41 is a pixel electrode circuit (active matrix drive circuit) for controlling drive voltages applied between the plurality of pixel electrodes 43 and the transparent electrode 45. The drive circuit 41 generates the drive voltage for causing the modulation unit 40 to display a desired phase pattern for each pixel electrode 43. The desired phase pattern is calculated by a computer which is not shown, and sent to the drive circuit 41.

The drive circuit 41 receives a signal relating to the phase pattern from the computer, and provides the drive voltage based on the signal to each of the plurality of pixel electrodes 43 of the modulation unit 40. When the drive voltage is applied from the drive circuit 41 to any one of the pixel electrodes 43, the orientation of the liquid crystal molecules 44a located on the pixel electrode 43 changes according to the magnitude of an electric field generated between the pixel electrode 43 and the transparent electrode 45. As a result, the refractive index of the relevant portion of the liquid crystal layer 44 changes. Thus, the optical path length of the modulation target light $L_1$ which transmits the portion of the liquid crystal layer 44 changes, and accordingly, the phase of the modulation target light $L_1$ which transmits the portion changes.

After the phase modulation, the modulation target light $L_1$ is output from the transparent substrate 49 to the outside of the modulation unit 40 as the modulated light $L_2$. By applying the drive voltages of various magnitudes to the plurality of pixel electrodes 43, a spatial distribution of a phase modulation amount can be electrically written, and various wavefront shapes can be realized in the modulated light $L_2$ as necessary.

Figure 3:
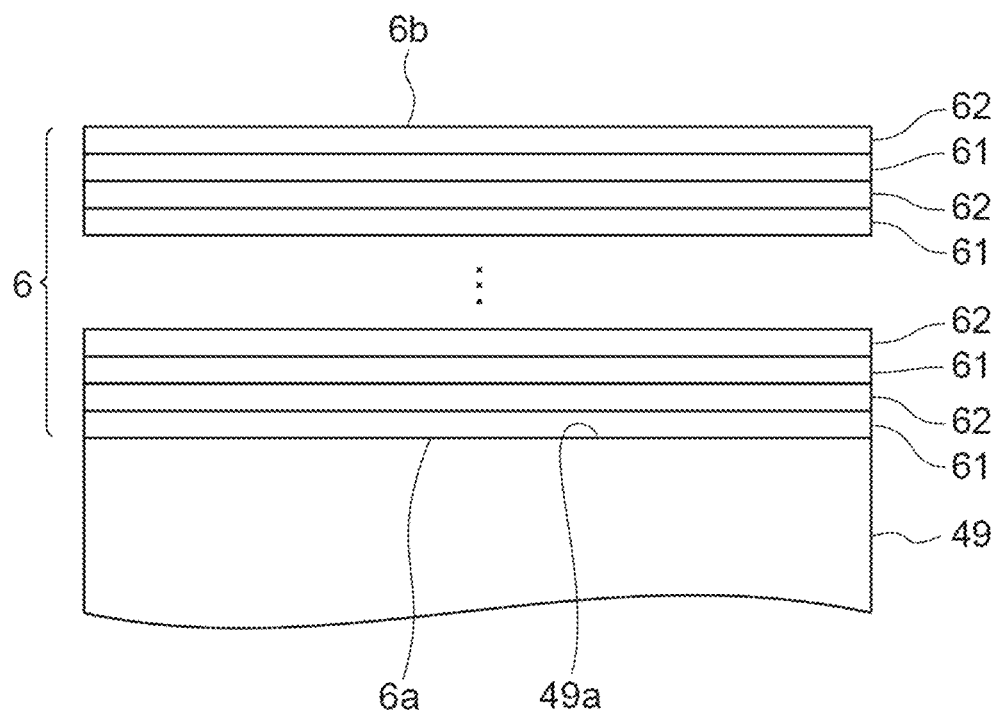
FIG. 3 is a schematic diagram illustrating a configuration example of an angle filter.

The angle filter 6 is disposed on a surface 49a of the transparent substrate 49 opposite to the surface 49b on which the transparent electrode 45 is formed. FIG. 3 is a schematic diagram illustrating a configuration example of the angle filter 6. The angle filter 6 is constituted by including a dielectric multilayer film in which dielectric layers (first dielectric layers) 61 and dielectric layers (second dielectric layers) 62 are alternately stacked.

The dielectric layer 61 has a first refractive index $n_1$. The dielectric layer 62 has a second refractive index $n_2$ being lower than the first refractive index $n_1$. The first refractive index $n_1$ is higher than a refractive index of the transparent substrate 49, and the second refractive index $n_2$ is lower than the refractive index of the transparent substrate 49. In one example, the first refractive index $n_1$ is larger than 1.5, and the second refractive index $n_2$ is smaller than 1.5.

In the above dielectric multilayer film, the dielectric layer 61 is disposed at one end 6a on the transparent substrate 49 side in the stacking direction. The dielectric layer 62 is disposed at the other end 6b on the side opposite to the transparent substrate 49 in the stacking direction. That is, the dielectric multilayer film is stacked in order from the dielectric layer 61 when viewed from the transparent substrate 49 side, and ends with the dielectric layer 62.

As constituent materials of the dielectric layers 61 and 62, an inorganic material, an organic material, a semiconductor, a metal, or air can be used.

As the inorganic material constituting the dielectric layer 61 being the high refractive index layer, at least one material included in the group consisting of titanium oxide ($TiO_2$), niobium pentoxide ($Nb_2O_5$), tantalum pentoxide ($Ta_2O_5$), hafnium oxide ($HfO_2$), zirconium dioxide ($ZrO_2$), magnesium oxide (MgO), aluminum oxide ($Al_2O_3$), silicon nitride ($Si_3N_4$), lanthanum fluoride ($LaF_3$), indium oxide ($In_2O_3$), tin-doped indium oxide (ITO), aluminum-doped zinc oxide (AZO), fluorine-doped tin oxide (FTO), IGZO, and carbon (C) may be used.

As the inorganic material constituting the dielectric layer 62 being the low refractive index layer, at least one material included in the group consisting of silicon dioxide ($SiO_2$), aluminum fluoride ($AlF_3$), calcium fluoride ($CaF_2$), magnesium fluoride ($MgF_2$), lithium fluoride (LiF), cryolite ($Na_3AlF_6$), chiolite ($Na_5Al_3F_{14}$), and sodium fluoride (NaF) may be used.

As the organic material constituting the dielectric layer 61 being the high refractive index layer, at least one material included in the group consisting of poly methyl α-bromo-acrylate, poly 2,3-dibromopropyl methacrylate, diallyl phthalate, poly phenyl methacrylate, poly vinyl benzoate, polystyrene, poly pentachlorophenyl methacrylate, poly σ-chlorostyrene, polyvinyl naphthalene, and polyvinyl carbazole may be used.

As the organic material constituting the dielectric layer 62 being the low refractive index layer, at least one material included in the group consisting of $CF_2=CF_2—CF_2=CF$ ($CF_3$) copolymer, poly trifluoroethyl methacrylate, poly isobutyl methacrylate, poly methyl acrylate, diethylene glycol bis allyl carbonate (CR-39) polymer, poly methyl methacrylate, silicone polymer, cellulose acetate, and poly methyl methacrylate may be used.

As the semiconductor constituting the dielectric layers 61 and 62, at least one material included in the group consisting of silicon (Si), germanium (Ge), gallium arsenide (GaAs), gallium nitride (GaN), indium antimonide (InSb), indium phosphide (InP), gallium phosphide (GaP), aluminum nitride (AlN), indium gallium arsenide (InGaAs), and indium gallium phosphide (InGaP) may be used.

In addition, the refractive index of each of the dielectric layers 61 and 62 can be adjusted by changing a composition ratio of the semiconductor, and can also be adjusted by changing a concentration of the material added to the semiconductor.

As the metal material constituting the dielectric layers 61 and 62, at least one material included in the group consisting of aluminum, chromium, copper, nickel, titanium, gold, silver, platinum, and molybdenum may be used.

When the dielectric layers 61 and 62 are formed of the inorganic material, the semiconductor, or the metal material, the dielectric layers 61 and 62 may be formed by various methods such as vacuum deposition, sputtering, resistance heating deposition, atomic layer deposition, laser ablation, or chemical vapor deposition. Further, when the dielectric layers 61 and 62 are formed of the organic material, the dielectric layers 61 and 62 may be formed by various methods such as spin coating, coating, or printing.

A thickness of each of the dielectric layers 61 and 62 is set according to a desired property required for the angle filter 6. In addition, the dielectric layers 61 and 62 may have a structure such as a metamaterial structure or a Fabry-Perot structure in which the refractive index can be arbitrarily changed from a specific value of the material.

Figure 4:
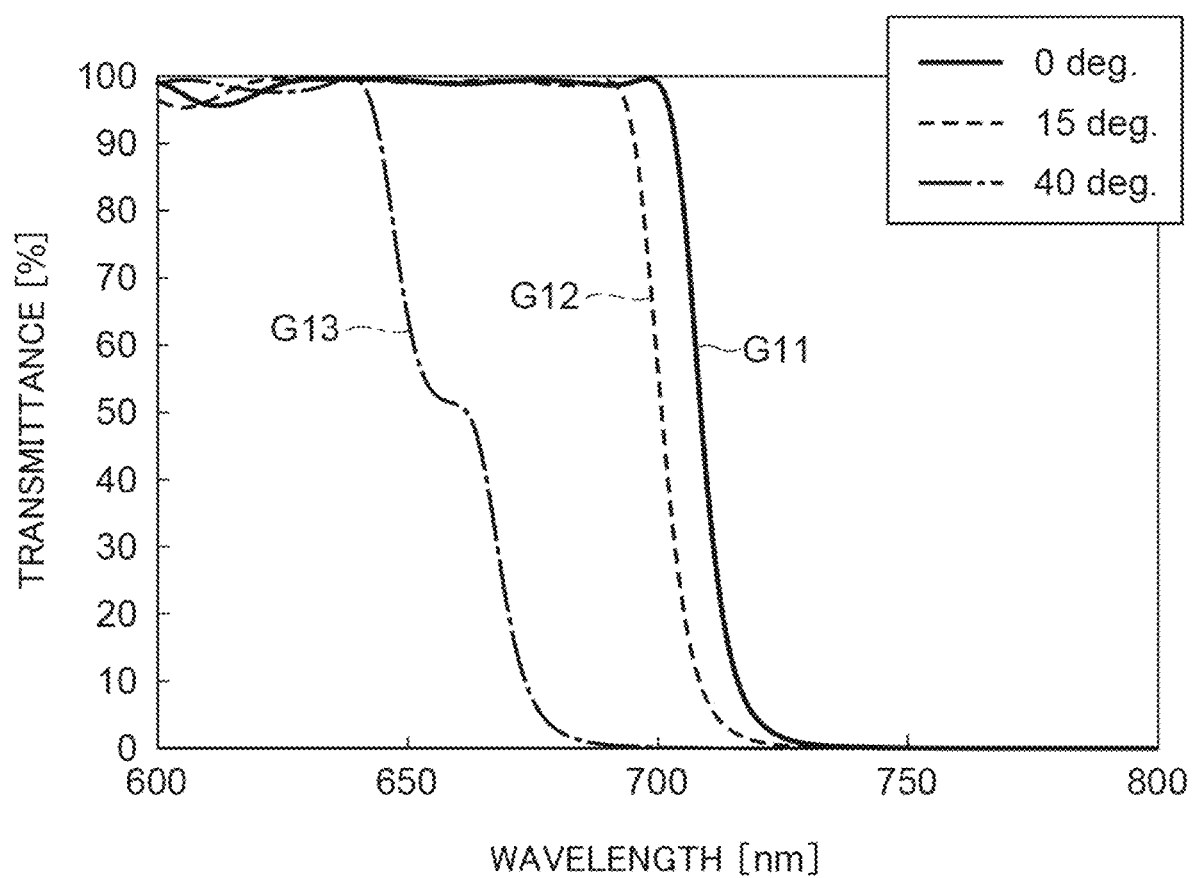
FIG. 4 is a graph showing an example of a relationship between a transmittance of a dielectric multilayer film and a wavelength of transmitted light.

The property and function of the angle filter 6 will be described. First, a case in which the dielectric layers located at both ends in the stacking direction of the dielectric multilayer film are the high refractive index layers will be described. FIG. 4 is a graph showing an example of a relationship between a transmittance of the above dielectric multilayer film and a wavelength of transmitted light.

In FIG. 4, the vertical axis indicates the transmittance (unit: %), and the horizontal axis indicates the wavelength (unit: nm). FIG. 4 shows a graph G11 when the incident angle of light for the dielectric multilayer film is set to 0° (that is, the incident direction of light is perpendicular to the surface of the angle filter 6), a graph G12 when the incident angle is set to 15°, and a graph G13 when the incident angle is set to 40°. In this example, the design wavelength is set to 690 nm.

As shown in FIG. 4, the dielectric multilayer film constitutes a lowpass filter which does not transmit light in a wavelength region longer than a certain cutoff wavelength and transmits light in a wavelength region shorter than the cutoff wavelength. In addition, the property changes depending on the incident angle of light, and the cutoff wavelength shifts to the shorter wavelength side as the incident angle increases. This shows that the transmittance of the dielectric multilayer film correlates with the incident angle of light at the specific wavelength.

Figure 5:
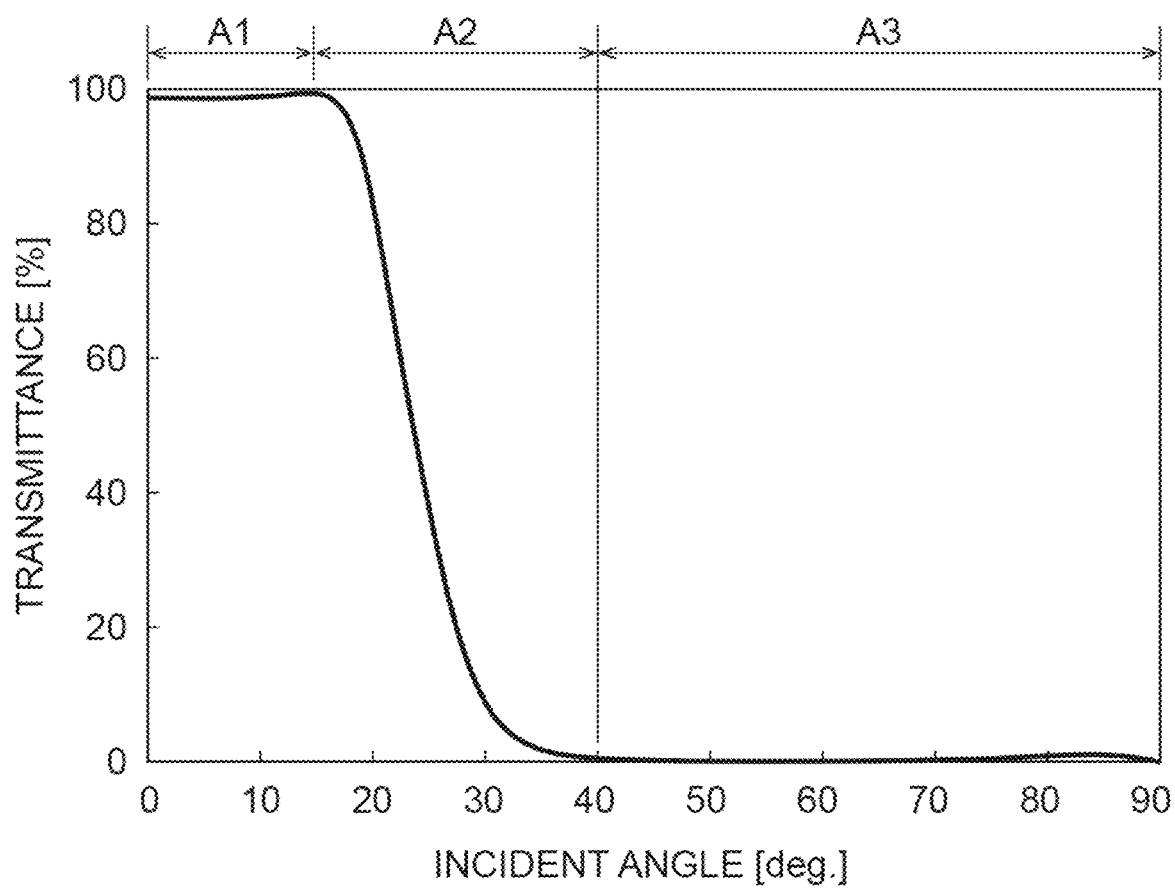
FIG. 5 is a graph showing a relationship between an incident angle of light and a transmittance in the same dielectric multilayer film as that used in FIG. 4.

FIG. 5 is a graph showing a relationship between the incident angle of light and the transmittance in the same dielectric multilayer film as that used in FIG. 4. In FIG. 5, the vertical axis indicates the transmittance (unit: %), and the horizontal axis indicates the incident angle (unit: degree).

As shown in FIG. 5, in this example, in a region A1 where the incident angle is relatively small, such as 15° or less, the transmittance of the dielectric multilayer film asymptotically approaches 100%. Further, in a region A3 where the incident angle is relatively large, such as 40° or more, the transmittance of the dielectric multilayer film asymptotically approaches 0%, and almost all of the light is reflected. Further, in a region A2 between the regions A1 and A3, the transmittance monotonically decreases with respect to the incident angle. In addition, in the following description, an angle at which the transmittance is 50% is defined as a cutoff angle.

In order to set a change rate (that is, a slope of the graph) of the transmittance with respect to the incident angle in the region A2 of the graph shown in FIG. 5 to a desired magnitude, the repetition number of the high refractive index layer and the low refractive index layer may be adjusted. As the repetition number of the high refractive index layer and the low refractive index layer increases, an absolute value of the change rate of the transmittance with respect to the incident angle increases, and the slope of the graph becomes steeper. In other words, as the repetition number of the high refractive index layer and the low refractive index layer decreases, the absolute value of the change rate of the transmittance with respect to the incident angle decreases, and the slope of the graph becomes gentler.

In order to set the cutoff angle to a desired magnitude, the thicknesses of the high refractive index layer and the low refractive index layer may be adjusted. As the high refractive index layer and the low refractive index layer become thicker, the cutoff angle moves to the long wavelength side. In other words, as the high refractive index layer and the low refractive index layer become thinner, the cutoff angle moves to the short wavelength side.

Figure 6:
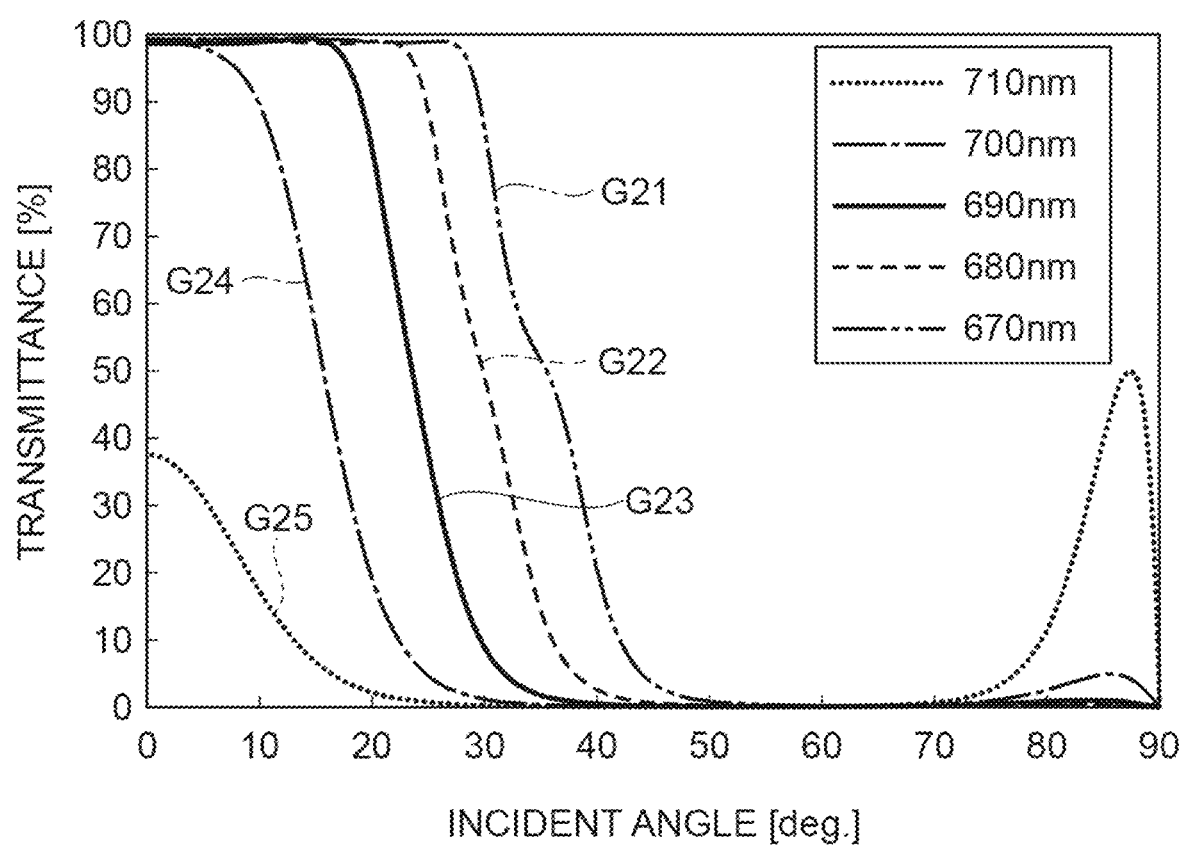
FIG. 6 is a graph showing a relationship between an incident angle and a transmittance when a design wavelength is set to 690 nm.

FIG. 6 is a graph showing a relationship between the incident angle and the transmittance in the case where the design wavelength is set to 690 nm, and shows a case where the wavelength is 690 nm (graph G23), and in addition, shows a case where the wavelength is 670 nm (graph G21), a case where the wavelength is 680 nm (graph G22), a case where the wavelength is 700 nm (graph G24), and a case where the wavelength is 710 nm (graph G25). In FIG. 6, the vertical axis indicates the transmittance (unit: %), and the horizontal axis indicates the incident angle (unit: degree). As shown in FIG. 6, it can be seen that the cutoff angle shifts to the lower angle side as the wavelength increases.

As described above, when the high refractive index layers are disposed at both ends in the stacking direction, the dielectric multilayer film functions as the lowpass filter which transmits light having the incident angle smaller than the cutoff angle and reflects light having the incident angle larger than the cutoff angle.

Next, a case in which the dielectric layers located at both ends in the stacking direction of the dielectric multilayer film are the low refractive index layers will be described. (a) in FIG. 7 is a graph showing an example of a relationship between a transmittance of the above dielectric multilayer film and a wavelength of transmitted light.

Figure 7:
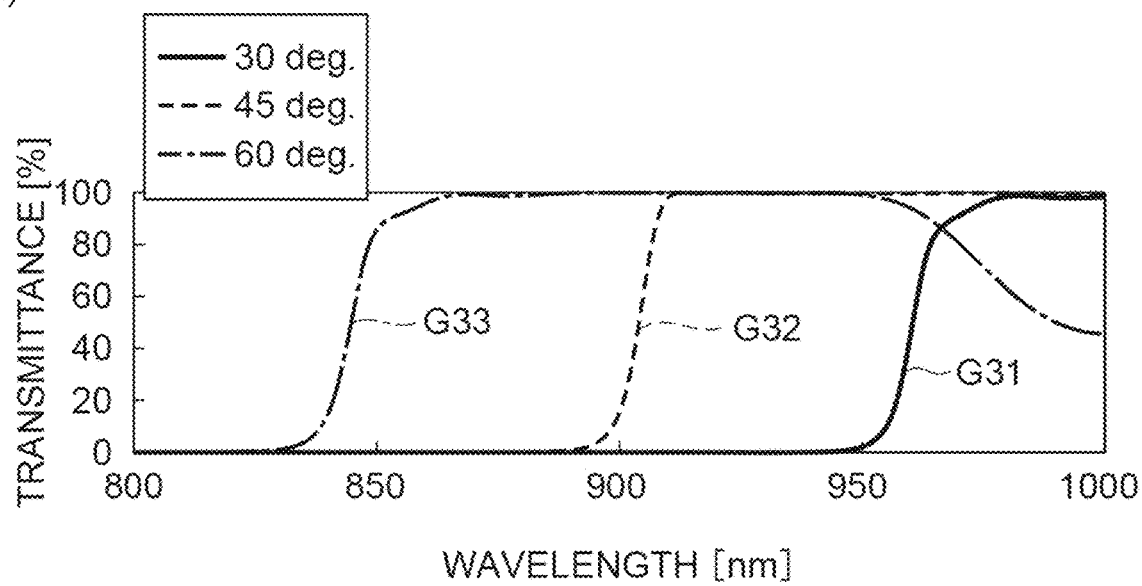
FIG. 7 includes (a) a graph showing an example of a relationship between a transmittance of the dielectric multilayer film and a wavelength of the transmitted light, and (b) a graph showing a relationship between an incident angle of light and a transmittance in the same dielectric multilayer film as that used in (a).
Figure 7:
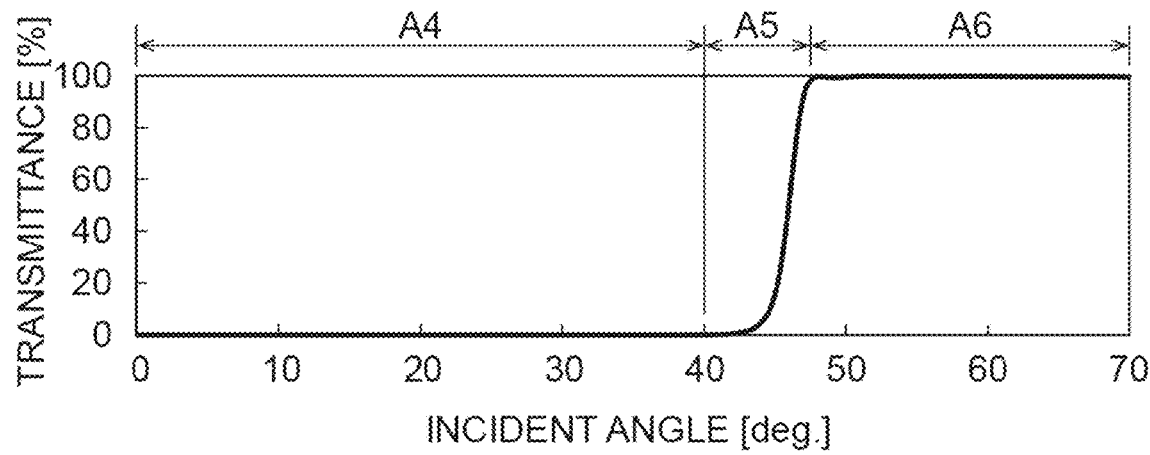

In (a) in FIG. 7, the vertical axis indicates the transmittance (unit: %), and the horizontal axis indicates the wavelength (unit: nm). (a) in FIG. 7 shows a graph G31 when the incident angle of light for the dielectric multilayer film is set to 30°, a graph G32 when the incident angle is set to 45°, and a graph G33 when the incident angle is set to 60°. In this example, the design wavelength is set to 900 nm.

As shown in (a) in FIG. 7, the dielectric multilayer film constitutes a highpass filter which transmits light in a wavelength region longer than a certain cutoff wavelength and does not transmit light in a wavelength region shorter than the cutoff wavelength. In addition, the property changes depending on the incident angle of light, and the cutoff wavelength shifts to the shorter wavelength side as the incident angle increases. This shows that the transmittance of the dielectric multilayer film correlates with the incident angle of light at the specific wavelength.

(b) in FIG. 7 is a graph showing a relationship between the incident angle of light and the transmittance in the same dielectric multilayer film as that used in (a) in FIG. 7. In (b) in FIG. 7, the vertical axis indicates the transmittance (unit: %), and the horizontal axis indicates the incident angle (unit: degree).

As shown in (b) in FIG. 7, in this example, in a region A4 where the incident angle is relatively small, such as 40° or less, the transmittance of the dielectric multilayer film asymptotically approaches 0%, and almost all of the light is reflected. Further, in a region A6 where the incident angle is relatively large, such as 50° or more, the transmittance of the dielectric multilayer film asymptotically approaches 100%. Further, in a region A5 between the regions A4 and A6, the transmittance monotonically increases with respect to the incident angle.

In order to set a change rate (that is, a slope of the graph) of the transmittance with respect to the incident angle in the region A5 of the graph shown in (b) in FIG. 7 to a desired magnitude, the repetition number of the high refractive index layer and the low refractive index layer may be adjusted. As the repetition number of the high refractive index layer and the low refractive index layer increases, an absolute value of the change rate of the transmittance with respect to the incident angle increases, and the slope of the graph becomes steeper. In other words, as the repetition number of the high refractive index layer and the low refractive index layer decreases, the absolute value of the change rate of the transmittance with respect to the incident angle decreases, and the slope of the graph becomes gentler.

In order to set the cutoff angle to a desired magnitude, the thicknesses of the high refractive index layer and the low refractive index layer may be adjusted. As the high refractive index layer and the low refractive index layer become thicker, the cutoff angle moves to the long wavelength side. In other words, as the high refractive index layer and the low refractive index layer become thinner, the cutoff angle moves to the short wavelength side.

As described above, when the low refractive index layers are disposed at both ends in the stacking direction, the dielectric multilayer film functions as the highpass filter which reflects light having the incident angle smaller than the cutoff angle and transmits light having the incident angle larger than the cutoff angle.

As illustrated in FIG. 3, in the angle filter 6 of the present embodiment, the dielectric layer 61 being the high refractive index layer is disposed at the one end 6*a* on the transparent substrate 49 side in the stacking direction, and the dielectric layer 62 being the low refractive index layer is disposed at the other end 6*b* on the side opposite to the transparent substrate 49.

In this case, the angle filter 6 is equivalent to the stack of the dielectric multilayer film in which the dielectric layers located at both ends in the stacking direction are the high refractive index layers and the dielectric multilayer film in which the dielectric layers located at both ends in the stacking direction are the low refractive index layers. Therefore, the angle filter 6 of the present embodiment functions as a bandpass filter having both the property as the lowpass filter shown in FIG. 5 and the property as the highpass filter shown in (b) in FIG. 7.

Figure 8:
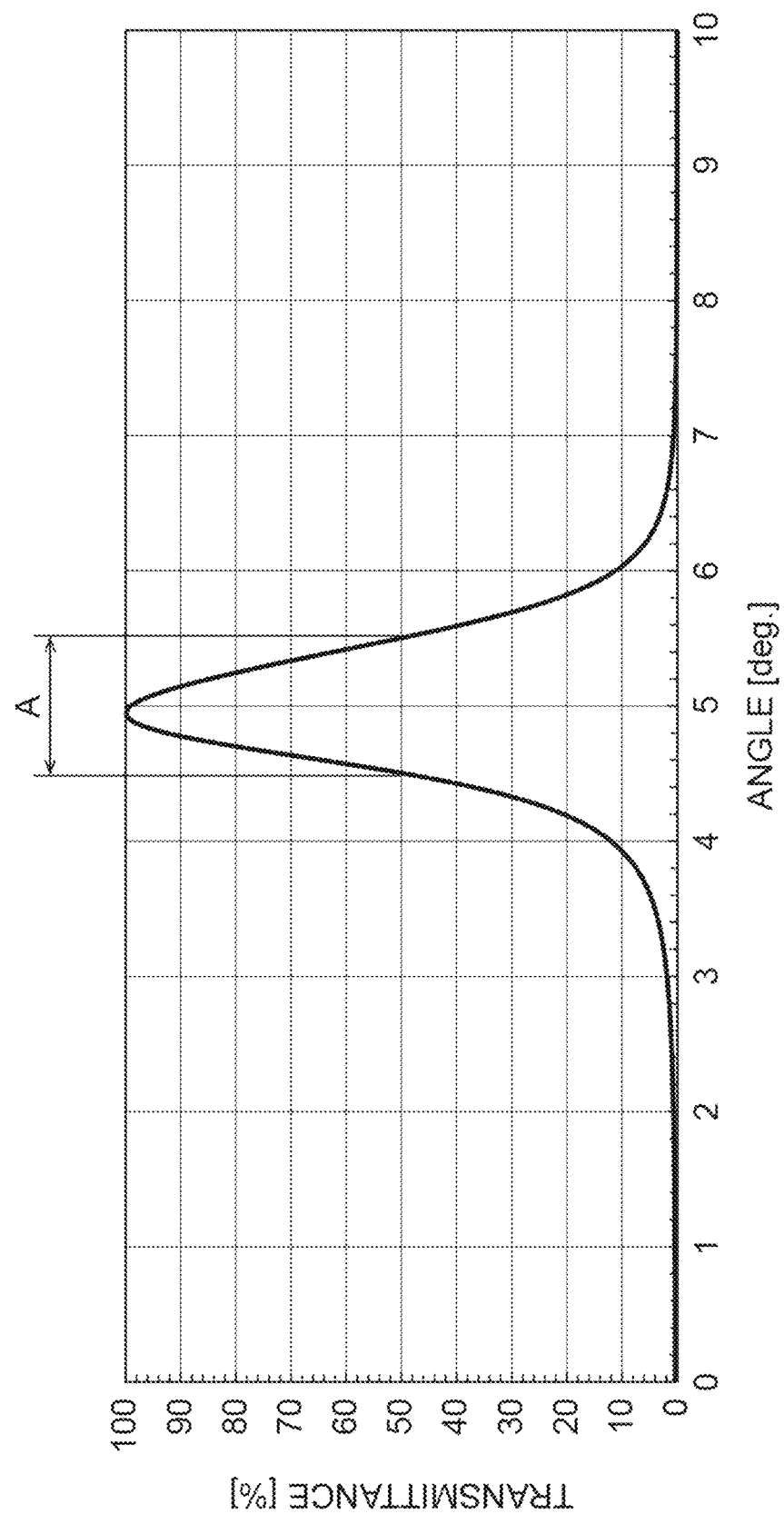
FIG. 8 is a graph showing an example of an angle-transmittance property of the angle filter.

FIG. 8 is a graph showing an example of an angle-transmittance property of the angle filter 6. In FIG. 8, the vertical axis indicates the transmittance (unit: %), and the horizontal axis indicates the incident angle (unit: degree). In this example, the transmittance when the incident angle is 5° is set to the maximum (100%), the transmittance is monotonically increased from 0% to 100% in a range of 3° to 5°, and the transmittance is monotonically decreased from 100% to 0% in a range of 5° to 7°.

When the above angle filter 6 is used, the predetermined (in other words, designed) incident angle of the modulation target light $L_1$ illustrated in FIG. 1 for the angle filter 6 is set to 5°. In this case, the incident angle of the modulated light $L_2$ emitted from the spatial light modulator 4 through the angle filter 6 for the angle filter 6 is also 5°. The angle filter 6 selectively transmits a desired angular component included in the modulated light $L_2$, and blocks unnecessary angular components included in the modulated light $L_2$ (high-order diffracted light, diffracted light generated from a gap between the pixels, diffracted light generated from a micron-order linear flaw inside the transparent substrate or inside the pixel, and the like).

The incident angle of the modulation target light $L_1$ for the angle filter 6 may be set within an angular range in which the transmittance is 50% or more (more preferably, 90% or more). In the example shown in FIG. 8, a width A of the angular range in which the transmittance is 50% or more is set to 1°, and further, the width A may be arbitrarily set. The smaller the width A, the more unnecessary angular components can be removed, and the quality of the modulated light $L_2$ can be improved.

In addition, according to the findings of present inventors, a diffraction angle of the diffracted light emitted from the spatial light modulator of the phase modulation type depends on a pixel structure, and is in general about 2° to 3°. Therefore, the width A may be, for example, less than 2°.

Effects obtained by the optical apparatus 1 of the present embodiment described above will be described. The transmittance and the reflectance of the angle filter 6 in the present embodiment change according to the incident angle of light, and the property thereof can be controlled by the layer structure (the thickness of each layer, the number of stacked layers, and the material) of the angle filter 6. Therefore, it is possible to selectively extract a desired angular component from light propagating through space and remove other angular components.

In particular, in the present embodiment, the angle filter 6 is disposed on the modulation unit 40 of the spatial light modulator 4, transmits light in an angular range including a predetermined incident or emitting angle of the parallel light, and blocks light outside the angular range. In the spatial light modulator 4, due to a diffraction effect occurring in each pixel, unnecessary light may be emitted in an angle direction different from the emitting angle of the modulated light $L_2$ corresponding to the incident angle of the modulation target light $L_1$. According to the optical apparatus 1 of the present embodiment, the above unnecessary light can be removed by using the angle filter 6, and thus, the quality of the modulated light $L_2$ emitted from the spatial light modulator 4 can be improved.

As described above, the width A of the angular range in which the transmittance is 50% or more may be less than 2°. By setting the angular range in which the angle filter 6 transmits light to be narrow as described above, it is possible to sufficiently remove the unnecessary light, and further improve the quality of the modulated light $L_2$ emitted from the spatial light modulator 4.

As in the present embodiment, the spatial light modulator 4 may include the transparent substrate 49 having the light transmitting property provided on the modulation unit 40. Further, the angle filter 6 may be provided on the transparent substrate 49, the refractive index $n_1$ of the dielectric layer 61 may be higher than the refractive index of the transparent substrate 49, the refractive index $n_2$ of the dielectric layer 62 may be lower than the refractive index of the transparent substrate 49, the dielectric layer 61 may be disposed at the one end 6a on the transparent substrate 49 side in the stacking direction of the dielectric multilayer film, and the dielectric layer 62 may be disposed at the other end 6b on the side opposite to the transparent substrate 49 in the stacking direction of the dielectric multilayer film.

For example, when the dielectric multilayer film of the angle filter 6 has the above configuration, it is possible to selectively extract a desired angular component and remove other unnecessary angular components. Further, the angle filter 6 is integrated with the transparent substrate 49, and thus, a relative angle adjustment mechanism between the angle filter 6 and the spatial light modulator 4 becomes unnecessary, and a simple and highly accurate optical arrangement can be realized. Further, the dielectric multilayer film is only formed on the transparent substrate 49, and thus, it is easy to form the angle filter 6.

(Modification)

Figure 9:
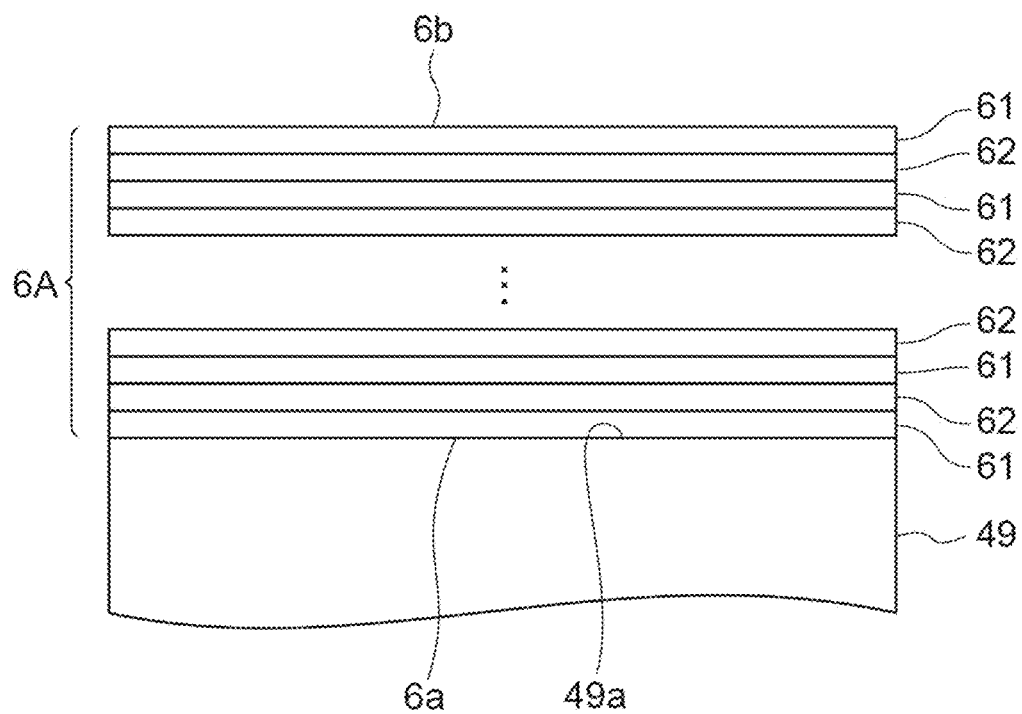
FIG. 9 is a schematic diagram illustrating a configuration of an angle filter according to a modification.

FIG. 9 is a schematic diagram illustrating a configuration of an angle filter 6A according to a modification of the above embodiment. The angle filter 6A is constituted by including a dielectric multilayer film in which the dielectric layers 61 and the dielectric layers 62 are alternately stacked. In addition, the arrangement of the angle filter 6A, and the refractive index and the constituent material of each of the dielectric layers 61 and 62 are the same as those of the angle filter 6 in the above embodiment.

In the above dielectric multilayer film, the dielectric layers 61 are disposed at both of the one end 6a on the transparent substrate 49 side in the stacking direction and the other end 6b. That is, the dielectric multilayer film is stacked in order from the dielectric layer 61 when viewed from the transparent substrate 49 side, and ends with the dielectric layer 61.

Figure 10:
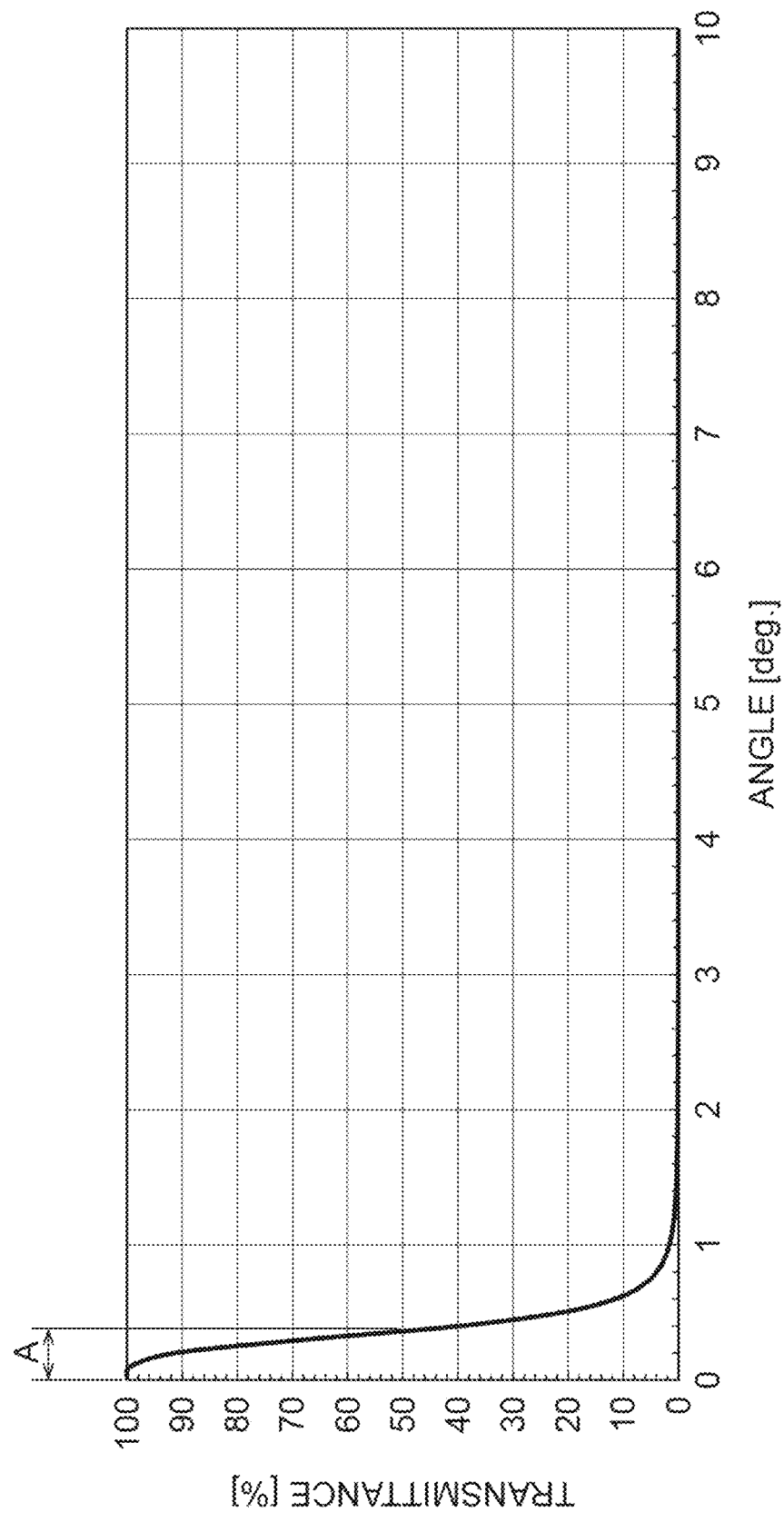
FIG. 10 is a graph showing an example of an angle-transmittance property of the angle filter according to the modification.

In this case, the angle filter 6A has the property as the lowpass filter. FIG. 10 is a graph showing an example of an angle-transmittance property of the angle filter 6A. In FIG. 10, the vertical axis indicates the transmittance (unit: %), and the horizontal axis indicates the incident angle (unit: degree). In this example, the transmittance when the incident angle is 0° is set to the maximum (100%), and the transmittance is monotonically decreased from 100% to 0% in a range of 0° to 1°.

When the above angle filter 6A is used, the predetermined (in other words, designed) incident angle of the modulation target light $L_1$ illustrated in FIG. 1 for the angle filter 6A is set to 0°. In this case, the incident angle of the modulated light $L_2$ emitted from the spatial light modulator 4 through the angle filter 6A for the angle filter 6A is also 0°. In other words, the optical axis of the modulation target light $L_1$ and the modulated light $L_2$ is set to be perpendicular to the surface of the angle filter 6A. The angle filter 6A selectively transmits a desired angular component included in the modulated light $L_2$, and blocks unnecessary angular components included in the modulated light $L_2$ (high-order diffracted light and the like).

In addition, in the example shown in FIG. 10, the width A of the angular range in which the transmittance is 50% or more is set to 0.5°, and further, the width A may be arbitrarily set. As in the above embodiment, the smaller the width A is, the more unnecessary angular components can be removed, and the quality of the modulated light $L_2$ can be improved. As an example, the width A may be less than 1°.

According to the configuration of the present modification, the same function and effects as those in the above embodiment can be achieved.

EXAMPLE

An example in which the angle filter 6A of the above embodiment is actually formed will be described. In this example, the design center wavelength is set to 633 nm, the high refractive index layer of the dielectric multilayer film is constituted by $TiO_2$, and the low refractive index layer is constituted by $MgF_2$.

Figure 11:
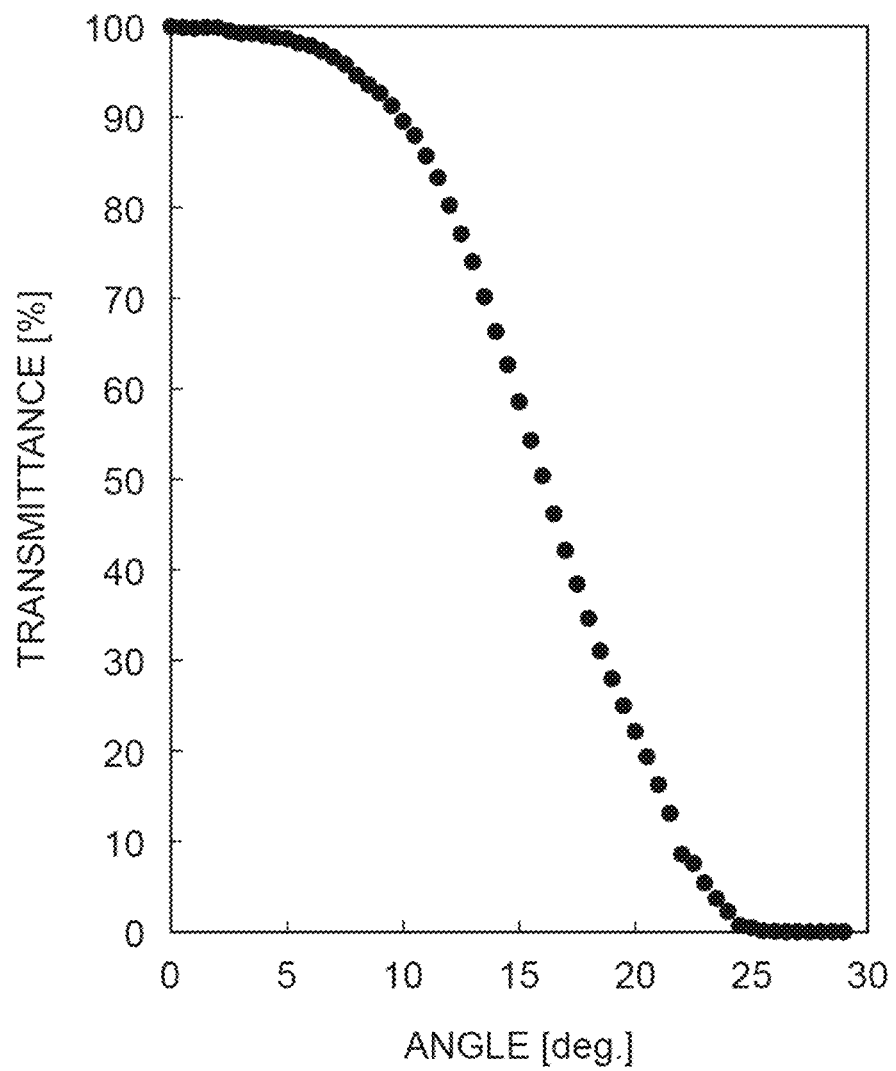
FIG. 11 is a graph showing a relationship between an incident angle and a transmittance of the angle filter at a wavelength of 633 nm, which is obtained by an example.
Figure 12:
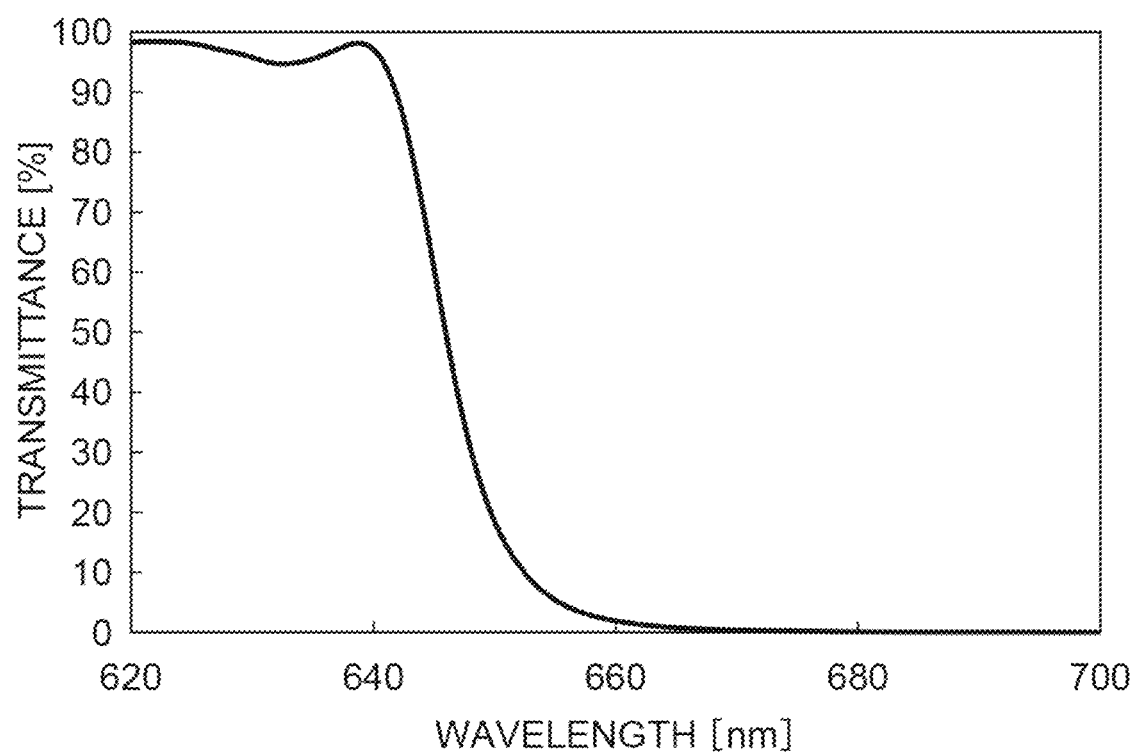
FIG. 12 is a graph showing a wavelength-transmittance property of the dielectric multilayer film.

FIG. 11 is a graph showing a relationship between the incident angle and the transmittance of the angle filter at the wavelength of 633 nm, which is obtained by the above example. As shown in FIG. 11, the transmittance gradually decreases from 0° to 25°, and the transmittance asymptotically approaches 0% when the incident angle exceeds 25°. As described above, the angle filter, being the lowpass filter in which the transmittance changes from 100% to 0% while the incident angle changes from 0° to 25°, was formed. For reference, a wavelength-transmittance property of the dielectric multilayer film is shown in FIG. 12.

The optical apparatus is not limited to the embodiments and configuration examples described above, and various other modifications are possible. For example, in the above embodiment, the angle filter is combined with the spatial light modulator, and further, the optical apparatus of the above configuration is not limited to the spatial light modulator, and may have a configuration in which the angle filter is combined with another optical element or optical component.

The optical apparatus of the above embodiment includes an optical system for outputting parallel light; and an angle filter disposed on an optical path of the parallel light output from the optical system, and the angle filter includes a dielectric multilayer film in which dielectric layers (first dielectric layers) having a first refractive index and dielectric layers (second dielectric layers) having a second refractive index lower than the first refractive index are alternately stacked.

The above optical apparatus may further include a spatial light modulator of a reflection type for inputting the parallel light output from the optical system, spatially modulating a phase of the parallel light, and outputting light, and the angle filter may be disposed on a modulation unit of the spatial light modulator, transmit light in an angular range including a predetermined incident or emitting angle of the parallel light, and block light outside the angular range.

As described above, in the spatial light modulator, due to a diffraction effect occurring in each pixel, unnecessary light may be emitted in an angle direction different from an emitting angle corresponding to an incident angle of light. On the other hand, according to the above optical apparatus, the above unnecessary light can be removed using the angle filter, and thus, the quality of light emitted from the spatial light modulator can be improved.

In the above optical apparatus, a width of the angular range in which a transmittance is 50% or more may be less than 2°. By setting the angular range in which the angle filter transmits light to be narrow as described above, the unnecessary light can be sufficiently removed, and the quality of light emitted from the spatial light modulator can be further improved.

In the above optical apparatus, the spatial light modulator may include a substrate having a light transmitting property provided on the modulation unit, and the angle filter may be provided on the substrate, the first refractive index may be higher than a refractive index of the substrate, and the second refractive index may be lower than the refractive index of the substrate, a dielectric layer located at one end on a substrate side in a stacking direction of the dielectric multilayer film may have the first refractive index, and a dielectric layer located at the other end on a side opposite to the substrate in the stacking direction of the dielectric multilayer film may have the second refractive index. For example, when the dielectric multilayer film has the above configuration, it is possible to selectively extract a desired angular component and remove other unnecessary angular components.

INDUSTRIAL APPLICABILITY

The embodiments can be used as an optical apparatus including an angle filter capable of selectively extracting a desired angular component from light propagating through space and removing other angular components.

REFERENCE SIGNS LIST

1—optical apparatus, 2—light source, 3—optical system, 4—spatial light modulator, 6, 6A—angle filter, 6a—one end, 6b—other end, 40—modulation unit, 41—drive circuit, 42—silicon substrate, 43—pixel electrode, 44—liquid crystal layer, 44a—liquid crystal molecule, 45—transparent electrode, 46a, 46b—alignment film, 47—dielectric mirror, 48—spacer, 49—transparent substrate, 49a, 49b—surface, 61, 62—dielectric layer, $L_1$—modulation target light, $L_2$—modulated light.

The invention claimed is:

1. An optical apparatus comprising:
an optical system configured to output parallel light;
an angle filter disposed on an optical path of the parallel light output from the optical system; and
a spatial light modulator configured to input the parallel light output from the optical system, spatially modulate a phase of the parallel light, and output light, wherein
the angle filter includes a dielectric multilayer film in which dielectric layers having a first refractive index and dielectric layers having a second refractive index lower than the first refractive index are alternately stacked, and
the angle filter is disposed on an optical path of modulated light output from the spatial light modulator as parallel light, and the angle filter is configured to transmit light in an angular range including a predetermined emitting angle of the modulated light, and block light outside the angular range.

2. The optical apparatus according to claim 1, wherein a width of the angular range in which a transmittance is 50% or more is less than 2°.

3. The optical apparatus according to claim 1, wherein the spatial light modulator is of a reflection type, and the angle filter is disposed on a modulation unit of the spatial light modulator.

4. The optical apparatus according to claim 3, wherein the spatial light modulator includes a substrate having a light transmitting property provided on the modulation unit, and wherein
the angle filter is provided on the substrate,
the first refractive index is higher than a refractive index of the substrate, and the second refractive index is lower than the refractive index of the substrate,
a dielectric layer located at one end on a substrate side in a stacking direction of the dielectric multilayer film has the first refractive index, and
a dielectric layer located at the other end on a side opposite to the substrate in the stacking direction of the dielectric multilayer film has the second refractive index.

* * * * *